(12) United States Patent
Jung

(10) Patent No.: US 9,453,544 B2
(45) Date of Patent: Sep. 27, 2016

(54) ELECTRONIC PARKING BRAKE FOR VEHICLE AND CONTROL METHOD THEREOF

(71) Applicant: HYUNDAI MOBIS CO., LTD., Seoul (KR)

(72) Inventor: Ha Min Jung, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/583,484

(22) Filed: Dec. 26, 2014

(65) Prior Publication Data
US 2015/0345580 A1    Dec. 3, 2015

(30) Foreign Application Priority Data

May 28, 2014  (KR) .......................... 10-2014-0064556

(51) Int. Cl.
| | | |
|---|---|---|
| *F16D 65/22* | (2006.01) | |
| *B60T 11/04* | (2006.01) | |
| *B60T 13/02* | (2006.01) | |
| *B60T 13/74* | (2006.01) | |
| *F16D 51/10* | (2006.01) | |
| F16D 121/24 | (2012.01) | |
| F16D 125/40 | (2012.01) | |
| F16D 125/60 | (2012.01) | |

(52) U.S. Cl.
CPC ............ *F16D 65/22* (2013.01); *B60T 11/046* (2013.01); *B60T 13/02* (2013.01); *B60T 13/746* (2013.01); *F16D 51/10* (2013.01); *F16D 2121/24* (2013.01); *F16D 2125/40* (2013.01); *F16D 2125/60* (2013.01)

(58) Field of Classification Search
CPC ...... F16D 65/22; F16D 51/10; B60T 11/046; B60T 13/02; B60T 13/746

USPC ........................................................... 701/70
See application file for complete search history.

(56) References Cited

U.S. PATENT DOCUMENTS

| | | | | |
|---|---|---|---|---|
| 6,374,962 B1* | 4/2002 | Doolittle | ................ | F16D 65/22 188/106 F |
| 6,533,082 B2* | 3/2003 | Gill | ........................ | B60T 7/107 188/156 |
| 8,720,653 B2* | 5/2014 | Han | ........................ | B60T 7/107 188/156 |
| 2014/0020997 A1* | 1/2014 | Bach | ....................... | F16D 51/16 188/325 |

FOREIGN PATENT DOCUMENTS

KR    10-2009-0110574 A    10/2009

* cited by examiner

*Primary Examiner* — Behrang Badii
*Assistant Examiner* — Michael Berns
(74) *Attorney, Agent, or Firm* — Knobbe Martens Olson & Bear LLP

(57) ABSTRACT

An electronic parking brake for a vehicle includes: a drum assembly braking a wheel; a driving motor generating a driving force for braking the wheel; a driving gear coupled to a driving shaft of the driving motor and rotated; a driven gear coupled to the driving gear and rotated; a cable operating member geared to the driven gear, and advanced or retreated by the rotation of the driven gear so as to operate a parking cable of the drum assembly; an elastic member restricting the movement of the cable operating member; a current sensing unit configured to sense a driving current of the driving motor and provide the sensed driving current; and a control unit configured to operate the driving motor during brake release, and control the operation of the driving motor based on a change of the driving current inputted from the current sensing unit during brake release.

8 Claims, 4 Drawing Sheets

ELECTRONIC PARKING BRAKE FOR VEHICLE AND CONTROL METHOD THEREOF

CROSS-REFERENCES TO RELATED APPLICATIONS

The present application claims priority to Korean application number 10-2014-0064556, filed on May 28, 2014, which is incorporated by reference in its entirety.

BACKGROUND

The present disclosure relates to an electronic parking brake (EPB) for a vehicle and a control method thereof, and more particularly, to an EPB for a vehicle, which changes a driving current of a driving motor by suppressing the movement of a cable operating member during brake release, through an elastic member provided in a space part where the cable operating member to pull a parking cable in a MOD (Motor On DIH)-type EPB is moved, thereby not only recognizing the position of the cable operating member based on the change of the driving current, but also preventing the damage of an actuator housing, and a control method thereof.

In general, a parking brake for a vehicle is a device which brakes a front wheel or rear wheel of the vehicle in order to maintain a parked state of the vehicle.

Recently, instead of a drum brake, a disk brake has been well used for a rear wheel of a vehicle. Thus, as a parking brake is provided separately from the disk brake, a DIH (Drum In Hat) parking brake is applied.

The related art of the present invention is disclosed in Korean Patent Laid-open Publication No. 2009-0110574 published on Oct. 22, 2009 and entitled "Load response limit switch typed electrical parking brake system in vehicle".

SUMMARY

Embodiments of the present invention are directed to an electronic parking brake (EPB) for a vehicle, which changes a driving current of a driving motor by suppressing the movement of a cable operating member during brake release, through an elastic member provided in a space part where the cable operating member to pull a parking cable in a MOD (Motor On DIH)-type EPB is moved, thereby recognizing the position of the cable operating member based on the change of the driving current, and a control method thereof.

Also, embodiments of the present invention are directed to an EPB for a vehicle, which suppresses excessive movement of a cable operating member through an elastic member, thereby preventing the damage of an actuator housing, and a control method thereof.

In one embodiment, an electronic parking brake (EPB) for a vehicle may include: a drum assembly braking a wheel; a driving motor generating a driving force for braking the wheel; a driving gear coupled to a driving shaft of the driving motor and rotated; a driven gear coupled to the driving gear and rotated; a cable operating member geared to the driven gear, and advanced or retreated by the rotation of the driven gear so as to operate a parking cable of the drum assembly; an elastic member restricting the movement of the cable operating member when the cable operating member is retreated by a preset distance or more during brake release; a current sensing unit configured to sense a driving current of the driving motor and provide the sensed driving current; and a control unit configured to operate the driving motor during brake release, and control the operation of the driving motor based on a change of the driving current inputted from the current sensing unit during brake release.

The driven gear may include: a shaft member screwed to the cable operating member; and a rotating member coupled to the outside of the shaft member, and having gear teeth formed on the outer circumferential surface thereof and coupled to the driving gear.

The elastic member may include a first elastic member which applies a first restricting force to the cable operating member when the cable operating member is retreated by a first distance or more.

The EPB may further include: a housing coupled to the drum assembly and housing the cable operating member; and a guide part coupled to the cable operating member, guiding the cable operating member along an inner circumferential surface of a space part within the housing when the cable operating member is operated, and preventing the cable operating member from rotating in the housing.

The first restricting force applied to the cable operating member when the cable operating member is retreated by the first distance or more may be generated through the guide part.

The elastic member may further include a second elastic member which applies a second restricting force larger than the first restricting force to the cable operating member, when the cable operating member is retreated by a second distance or more, the second distance being larger than the first distance.

The control unit may stop the operation of the driving motor, when the driving current reaches a first value or a first reference time elapses after a minimum value of the driving current inputted from the current sensing unit is detected during brake release.

When the operation of the driving motor is not stopped even though the driving current reached the first value or the first reference time elapsed after the minimum value was detected, the control unit may forcibly stop the operation of the driving motor by directly controlling the operation of the driving motor in case where the driving current reaches a second value larger than the first value or a second reference time longer than the first reference time elapses after the minimum value was detected.

In another embodiment, a control method of an EPB for a vehicle may include: operating, by a control unit, a driving motor to release a brake, and then receiving a driving current flowing in the driving motor from a current sensing unit; detecting, by the control unit, a minimum value of the driving current; determining, by the control unit, whether the driving current reaches a first value; and stopping, by the control unit, the operation of the driving motor when the driving current reaches the first value.

The EPB may include an elastic member which restricts movement of a cable operating member when the cable operating member is retreated by a preset distance or more by the operation of the driving motor during brake release.

The elastic member may include a first elastic member which applies a first restricting force to the cable operating member, when the cable operating member is retreated by a first distance or more.

The elastic member may further include a second elastic member which applies a second restricting force larger than the first restricting force to the cable operating member, when the cable operating member is retreated by a second distance or more, the second distance being longer than the first distance.

The control method may further include forcibly stopping, by the control unit, the operation of the driving motor by directly controlling the operation of the driving motor when the driving current reaches a second value larger than the first value, in case where the driving current increases even after the stopping of the operation of the driving motor.

In another embodiment, a control method of an EPB for a vehicle may include: operating, by a control unit, a driving motor to release a brake and then receiving a driving current flowing in a driving motor from a current sensing unit; detecting, by the control unit, a minimum value of the driving current; and stopping, by the control unit, the operation of the driving motor when a first reference time elapses in case where the minimum value is detected.

The EPB may include an elastic member which restricts movement of a cable operating member when the cable operating member is retreated by a preset distance or more by the operation of the driving motor during brake release.

The elastic member may include a first elastic member which applies a first restricting force to the cable operating member, when the cable operating member is retreated by a first distance or more.

The elastic member may further include a second elastic member which applies a second restricting force larger than the first restricting force to the cable operating member, when the cable operating member is retreated by a second distance or more, the second distance being longer than the first distance.

The control method may further include forcibly stopping, by the control unit, the operation of the driving motor by directly controlling the operation of the driving motor when a second reference time longer than the first reference time elapses after the minimum value is detected, in case where the driving current increases even after the stopping of the operation of the driving motor.

DESCRIPTION OF SPECIFIC EMBODIMENTS

Figure 1:
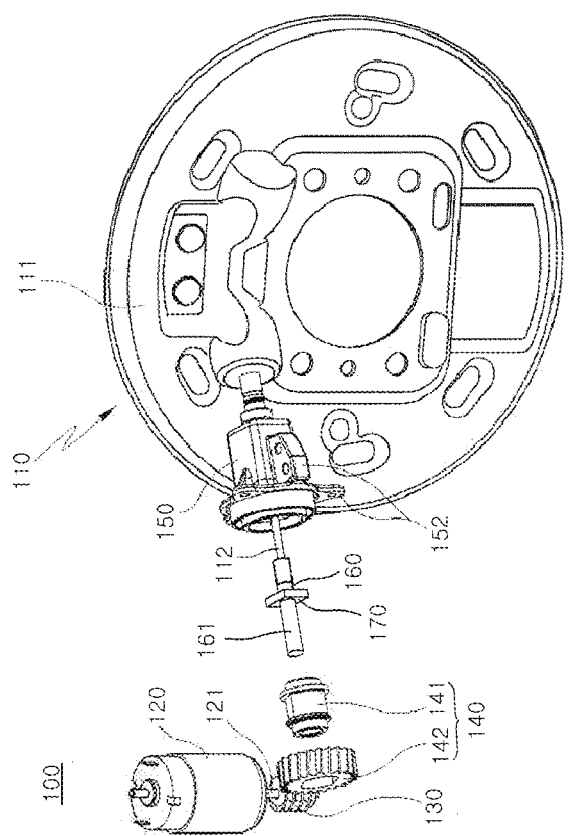
FIG. 1 is an exploded perspective view of an electronic parking brake (EPB) for a vehicle in accordance with an embodiment of the present invention.

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

A disk brake is used for a rear wheel of a vehicle. Thus, as a parking brake, a DIH (Drum In Hat) parking brake is applied. The DIH parking brake has a structure in which a drum brake is provided in the disk brake. When an operating unit is moved by a manipulation for a brake lever, a brake shoe is expanded toward a drum fixed to a wheel, and the drum and a lining mounted on the brake shoe rub against each other so as to generate a parking brake force. Then, when the brake lever is manipulated again to release the parking brake force, the brake shoe is returned to the original position by an elastic force of a return spring.

In such a parking brake, however, as a driver pulls the brake lever in person so as to move a cable, the parking brake is operated. Thus, convenience and performance may be degraded, and an EPB which has been recently applied cannot be applied to the parking brake.

The EPB is electronically controlled unlike an existing cable-type parking brake. While a vehicle is stopped, a computer determines the speed of the vehicle, the rotation of an engine, or whether the brake is operated, and the EPB is locked to the depth at which a driver steps on a brake pedal. Thus, although the driver does not step on the brake pedal while the vehicle is stopped, the brake is unlikely to be released. When the driver wants to start the vehicle, the brake is automatically released in case where the driver steps on the brake pedal. Thus, the driver may start the vehicle without an additional operation.

When the EPB is applied, the vehicle is not moved back even in case where the vehicle starts at the slope. Furthermore, even when stuck in a terrible traffic jam, the vehicle is moved forward only in case where the driver increases the speed. Thus, the driver does not need to frequently step on an accelerator pedal. However, the DIH parking brake cannot be applied to the EPB.

Therefore, a MOD (Motor In DIH)-type EPB has been developed. The MOD-type EPB pulls a cable using a motor, a worm gear, a nut screw fixed to the worm gear, and a bolt screw of which the rotation is restricted, and provides a stroke to an operating lever of a parking brake, thereby transmitting a load to the DIH parking brake. In other words, the worm gear of the motor switches the rotating shaft from a motor-axis direction to a cable operation direction, and the switched rotating shaft (rotation of a worm gear-integrated nut) provides an axial motion (tightening) of a bolt of which the rotation is restricted by a bolt guide. That is, when the nut is rotated to move the bolt in the axial direction, a parking cable at the end of the bolt screw is pulled to transmit a load to the DIH parking brake.

The MOD-type EPB can recognize an accurate position at which the EPB is released, when a position sensor is used. In this case, however, the production cost is increased, and the system becomes complex. Thus, in order to address this, a method for determining a release position of the EPB through current control can be applied. In this method, however, current values may be scattered depending on the number of operations, a sample, an external impact, and environment.

When the release position of the EPB is determined through the current control, the release position of the EPB is changed in case where the current values are scattered. Thus, when the EPB is excessively released, an actuator case may be damaged by an impact, and when the EPB is insufficiently released, a brake drag may occur.

Figure 2:
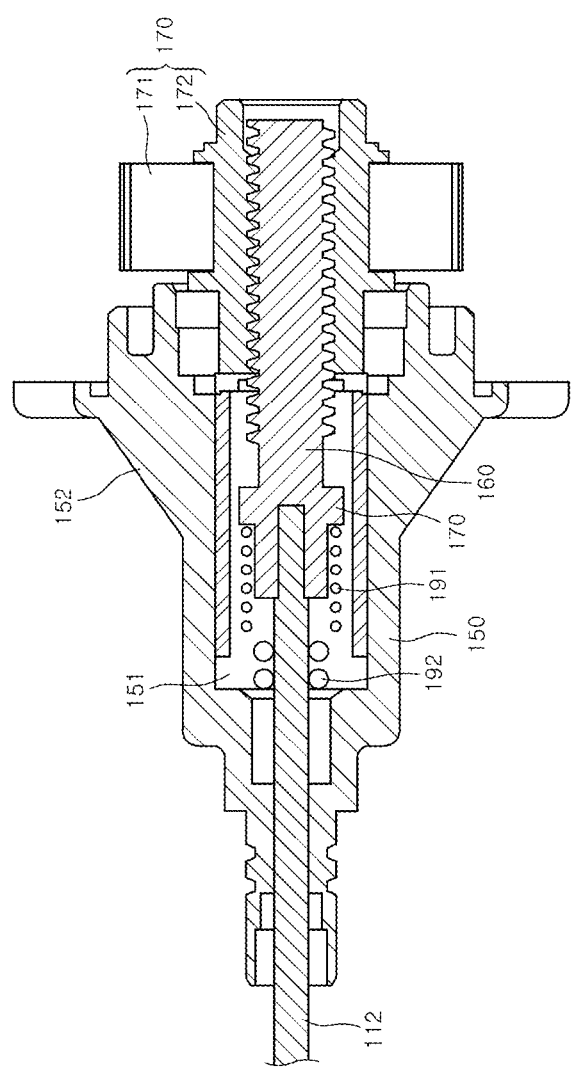
FIG. 2 is a cross-sectional view illustrating a coupling structure between a bolt screw and a housing in the EPB in accordance with the embodiment of the present invention.
Figure 3:
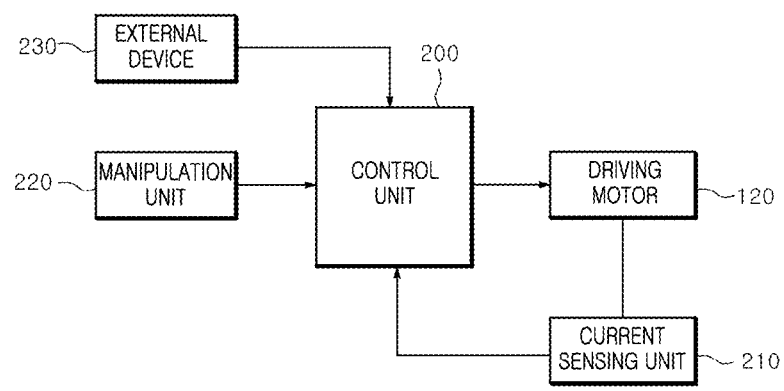
FIG. 3 is a block configuration diagram illustrating a control device of the EPB in accordance with the embodiment of the present invention.
Figure 4:
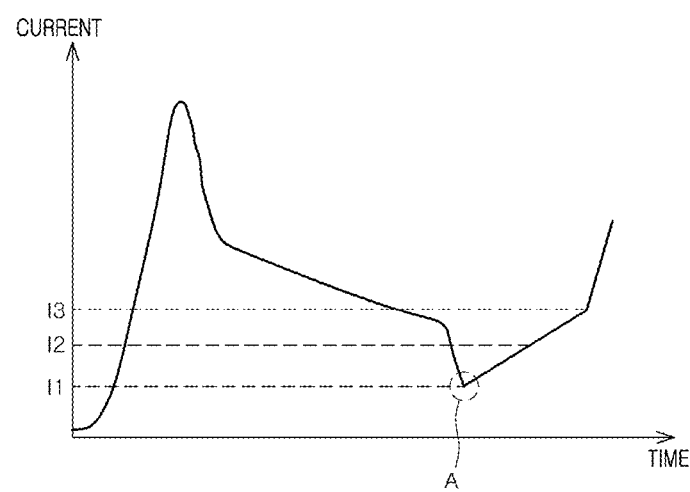
FIG. 4 is a graph illustrating a driving current of a driving motor during brake release in the EPB in accordance with the embodiment of the present invention.

FIG. 1 is an exploded perspective view of an electronic parking brake (EPB) for a vehicle in accordance with an embodiment of the present invention. FIG. 2 is a cross-sectional view illustrating a coupling structure between a bolt screw and a housing in the EPB in accordance with the embodiment of the present invention. FIG. 3 is a block configuration diagram illustrating a control device of the EPB in accordance with the embodiment of the present invention. FIG. 4 is a graph illustrating a driving current of a driving motor during brake release in the EPB in accordance with the embodiment of the present invention.

As illustrated in FIGS. 1 to 3, the EPB 100 in accordance with the embodiment of the present invention includes a drum assembly 110, a driving motor 120, a driving gear 130, a driven gear 140, a housing 150, a cable operating member 160, a guide part 170, and an elastic member.

First, when a parking cable 112 of the drum assembly 110 is pulled, an operating lever is pulled together, and a lining connected to the operating lever is closely attached to the drum 111. Then, a frictional force is generated between the drum 111 and the lining, and brakes a wheel.

The driving motor 120 is provided outside the drum assembly 110, and serves to generate a driving force for a brake operation of the parking brake. The driving motor 120 generates a rotational force. The driving motor 120 includes a driving gear 130 provided on a driving shaft 121 thereof, and the driving gear 130 is coupled to the driven gear 140 in order to linearly move the cable operating member 160 to be described below.

The driving gear 130 is coupled to the driving shaft 121 of the driving motor 120, and rotated together with the driving shaft 121. The driving gear 130 converts the rotational force of the driving motor 120 in the orthogonal direction, and transmits the converted force to the driven gear 140. The driving gear 130 may include a worm gear. The driving gear 130 may be integrated with the driving shaft 121, when gear teeth are formed on the outer circumferential surface of an end of the driving shaft 121.

The driven gear 140 is screwed to the other end of the cable operating member 160 which is housed in a space part 151 of the housing 150 and protrudes to the other end of the housing 150. The driven gear 140 is rotated by the driving motor 120 and advances or retreats the cable operating member 160.

The driven gear 140 includes a shaft member 141 and a rotating member 142. The shaft member 141 is screwed to the outer circumferential surface of the cable operating member 160, and the rotating member 142 is coupled to the outer circumferential surface of the shaft member 141, and has gear teeth formed on the outer circumferential surface thereof.

The shaft member 141 is inserted and fixed into the rotating member 142, and rotated together when the rotating member 142 is rotated by the driving gear 130 to be described below. That is, the shaft member 141 has flat surfaces formed on the outer circumference thereof, and the rotating member 142 has flat surfaces formed on the inner circumference thereof so as to correspond to the flat surfaces of the shaft member 141. Thus, when the rotating member 142 is rotated, the shaft member 141 does not spin alone, but is rotated together with the rotating member 142 through the flat surfaces of the shaft member 141 and the flat surfaces of the rotating member 142.

The shaft member 141 and the rotating member 142 may be integrated with each other. However, the shaft member 141 and the rotating member 142 may be manufactured separately and then coupled to each other, in consideration of difficulties in processing and molding.

The driven gear 140 is rotated by the driving gear 130 coupled to the driving shaft 121 of the driving motor 120. When the driven gear 140 is rotated by the rotation of the driving gear 130, the driven gear 140 may be rotatably supported by the housing 150 so as to rotate in place.

The housing 150 has the space part 151 formed therein, and both ends thereof are connected through the space part 151. One end of the housing 150 is coupled to the rear surface of the drum 111 through the drum 111 of the drum assembly 110.

The space part 151 of the housing 150 has a larger size than the outer diameter of the cable operating member 160 such that the cable operating member 160 is housed in the space part 151 and advanced or retreated in the space part 151. That is, the inner diameter of the space part 151 may be set to be larger than the outer diameter of the cable operating member 160. Thus, when the cable operating member 160 is advanced or retreated, the cable operating member 160 does not come in contact with the inner surface of the space part 151.

Outside the housing 150, a fixing part 152 is formed to fix the housing 150 to the drum assembly 110 through a fastening member. The fixing part 152 may be formed to protrude from the outer circumferential surface of the housing 150 or constructed by forming a flange on the outer circumference of the other end of the housing 150.

The cable operating member 160 has one end connected to the parking cable 112 and the other end coupled to the rotating member 142. Thus, the cable operating member 160 serves to pull or release the parking cable 112 while being advanced or retreated by the rotation of the rotating member 142.

The one end of the cable operating member 160 is inserted into the housing 150 and connected to the parking cable 112 which is inserted into the housing 150 through the drum 111 of the drum assembly 110. The other end of the cable operating member 160 protrudes from the other end of the housing 150 so as to be coupled to the rotating member 142.

The cable operating member 160 is coupled to the driven gear 140. When the driven gear 140 is rotated, the cable operating member 160 is advanced or retreated to pull or release the parking cable 112, thereby operating or releasing the parking brake 100. The cable operating member 160 includes a bolt screw having a screw thread 161 formed on the outer circumferential surface thereof.

Furthermore, the guide part 170 is installed on the cable operating member 160. When the rotating member 142 is rotated by the operation of the driving motor 120 and advances or retreats the cable operating member 160 in case where the parking brake 100 is operated or released, the guide part 170 guides the cable operating member 160 to be advanced or retreated in the space part 151 while preventing the cable operating member 160 from being rotated together with the rotating member 142 in the space part 151 of the housing 150.

The elastic member is provided in the space part 151. When the cable operating member 160 is retreated by a preset distance or more during brake release, the elastic member restricts the movement of the cable operating member 160 and changes the driving current of the driving motor 120. Thus, based on the change of the driving current, the position of the cable operating member 160 can be accurately recognized.

The elastic member includes a first elastic member 191 and a second elastic member 192. When the cable operating member 160 is moved back by a first distance or more, the first elastic member 191 applies a first restricting force to the guide part 170 and changes the driving current of the driving motor 120 such that the position of the cable operating member 160 can be recognized.

When the cable operating member 160 is moved back by a second distance or more, the first elastic member 191 applies a second restricting force larger than the first restricting force to the guide part 2, and thus prevents collision before the cable operating member 160 is excessively moved back and collides with the housing. The second distance is larger than the first distance.

Furthermore, as illustrated in FIG. 3, a current sensing unit 210 senses a driving current of the driving motor 120 and provides the sensed driving current to a control unit 200.

When a user operates or releases the brake through a manipulation unit 220 or an external device 230 such as an antilock braking system operates or releases the brake, the control unit 200 operates the driving motor 12. When the brake is released, the control unit 200 stops the operation of the driving motor 120 by sensing a change of the driving current inputted from the current sensing unit 210.

At this time, the control unit 200 stops the operation of the driving motor 120 when the driving current increases by a first value I2 or more or a first reference time elapses after the minimum value is detected from the slope of the driving current inputted from the current sensing unit 210.

FIG. 4 is illustrates the change of the driving current when the brake is released. Referring to FIG. 4, since a large load is applied to the drum assembly 110 at the initial stage, the driving current rapidly increases and then stably decreases. Then, when the cable operating member 160 is retreated by the first distance and restricted by the first elastic member 191, the driving current increases again. Thus, the driving current has the minimum value I1 at a time point A.

When the driving current increases to the first value I2 after the minimum value I1 is detected, the control unit 200 stops the operation of the driving motor. At this time, the control unit 200 may be configured to stop the operation of the driving motor 120, when the first reference time elapses after the minimum value I1 of the driving current is detected.

As described above, the control unit 200 may stop the operation of the driving motor 120 when the driving current increases by the preset value or more or the first reference time elapses after the minimum value is detected from the slope of the driving current inputted from the current sensing unit 210. However, when an abnormality occurs in the control logic of the control unit 200, the driving current may continuously increase to more than the first value I2. Then, the cable operating member 160 is continuously retreated and restricted by the second elastic member 192. Then, the driving current increases while the slope thereof rapidly changes after a second value I3.

Thus, when the driving current reaches the second value I3 after the minimum value I1, the control unit 200 may forcibly stop the driving motor 120 by directly controlling the operation of the driving motor 120. Then, although the driving current temporarily increases, the control unit 200 may stop the operation of the driving motor 120, and prevent the cable operating member 160 from excessively moving and colliding with the housing 150. In another embodiment, when a second reference time longer than the first reference time elapses after the minimum value I1, the control unit 200 may forcibly stop the driving motor 120 by directly controlling the operation of the driving motor 120.

The operation of the EPB for a vehicle in accordance with the embodiment of the present invention will be briefly described as follows.

First, suppose that a state before the parking brake 100 is operated is an initial state. When a vehicle is traveling or temporarily stops in the initial state, the parking brake 100 is not operated. That is, while the parking brake 100 is not operated, one end of the cable operating member 160 is moved toward the drum assembly 110 from the space part 151 of the housing 150, and the parking cable 112 is not pulled. Thus, since a lining (not illustrated) connected to the parking cable 112 is not closely attached to the drum 111 but separated from the drum 111, no frictional force is applied.

Then, when a driver parks the vehicle after operating the vehicle, the driver manipulates an operating lever or operating button of the manipulation unit 220 provided at a driver's seat and operates the parking brake, in order to stop the vehicle for a long time.

Then, the control unit 200 operates the driving motor 120 to generate a rotational force. Then, the driving gear 130 fixed to the driving shaft 121 of the driving motor 120 is rotated, and the driven gear 140 coupled to the driving gear 130 is rotated in place.

At this time, the cable operating member 160 which is screwed to the driven gear 140 and housed in the space part 151 of the housing 150 is moved toward the opposite side of the drum assembly 110. Then, the parking cable 112 connected to one end of the cable operating member 160 is pulled away from the drum assembly 110. At this time, the operating lever (not illustrated) connected to the parking cable 112 is pulled, and the lining (not illustrated) connected to the operating lever pressurizes the drum 111 while being expanded toward the inner rim of the drum 111.

Then, a friction force is generated between the lining and the inner circumferential surface of the rim of the drum, thereby braking the wheel of the vehicle.

Then, when the operation of the parking brake 100 is released, the control unit 200 operates the driving motor 120 to generate a reverse rotational force, and the driving gear 130 fixed to the driving shaft 121 of the driving motor 120 is reversely rotated. Thus, the driven gear 140 coupled to the driving gear 130 is reversely rotated in place.

At this time, the cable operating member 160 which is screwed to the driven gear 140 and housed in the space part 151 of the housing 150 is moved toward the drum assembly 110. Then, while the parking cable 112 connected to one end of the cable operating member 160 is released toward the drum assembly 110, the operating lever connected to the parking cable 112 is released. Then, the lining which has been connected to the operating lever so as to pressurize the inner rim of the drum 111 is separated from the drum 111, thereby releasing the braking force of the parking brake 100.

When the cable operating member 160 is moved by the first distance, the movement of the cable operating member 160 is restricted while the first elastic member 191 and the guide part 170 come in contact with each other. Then, since the driving motor 120 tends to continuously move the cable operating member 160, the driving current increases. When the driving current reaches the first value I2 or the first reference time elapses from the time point A, the control unit 200 stops the operation of the driving motor 120.

As described above, the control unit 200 needs to stop the operation of the driving motor 120 when the driving current increases to more than the first value I2 or the first reference time elapses after the minimum value is detected from the slope of the driving current. However, when an abnormality occurs in the control logic, the driving current may continuously increase to more than the first value I2. Then, the cable operating member 160 is continuously retreated and restricted by the second elastic member 192. Then, the driving current increases while the slope thereof rapidly changes after the second value I3. When the driving current reaches the second value I3 after the minimum value I1, the control unit 200 may forcibly stop the driving motor 120 by directly controlling the operation of the driving motor 120. Then, although the driving current temporarily increases, the control unit 200 may stop the operation of the driving motor 120, and prevent the cable operating member 160 from excessively moving and colliding with the housing 150. In another embodiment, when the second reference time longer than the first reference time elapses after the minimum value I1, the control unit 200 may forcibly stop the driving motor 120 by directly controlling the operation of the driving motor 120.

Figure 5:
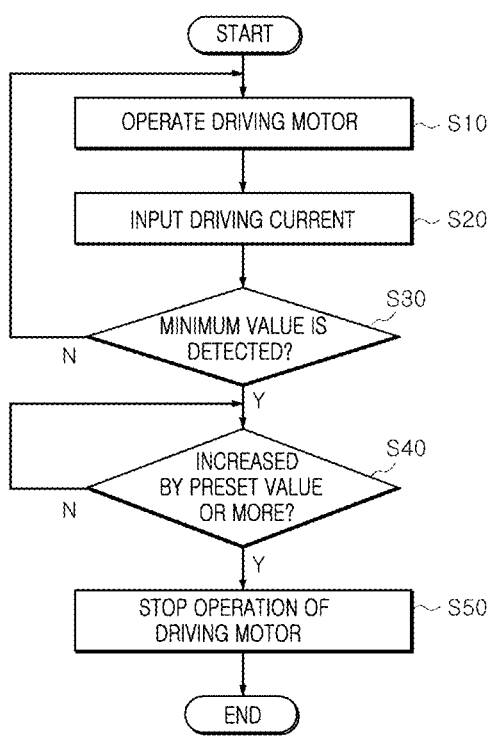
FIG. 5 is a flowchart for describing a control method of an EPB for a vehicle in accordance with an embodiment of the present invention.

FIG. 5 is a flowchart for describing a control method of an EPB for a vehicle in accordance with an embodiment of the present invention.

As illustrated in FIG. 5, the control method of the EPB for a vehicle in accordance with the embodiment of the present invention is performed as follows. First, the control unit 200 operates the driving motor 120 to release the brake at step S10.

The control unit 200 operates the driving motor 120 to pull the parking cable 112 connected to one end of the cable operating member 160 during brake operation. Then, a frictional force is generated between the lining and the inner circumferential surface of the rim of the drum 111, and brakes a wheel of the vehicle.

Then, when the brake is released, the control unit 200 operates the driving motor 120 to generate a reverse rotational force. Thus, while the parking cable 112 connected to the one end of the cable operating member 160 is released toward the drum assembly 110, the lining which has pressurized the inner rim of the drum 111 is separated from the drum 111, and the braking force of the parking brake 100 is released.

As such, while the cable operating member 160 is advanced or retreated by the driving motor 120, the parking cable 112 is pulled or released to operate or release the brake.

After the control unit 200 operates the driving motor 120, the driving current flowing in the driving motor 120 is received from the current sensing unit 210 at step S20.

Referring to FIG. 4 illustrating the change of the driving current during brake release, the driving current rapidly increases and then stably decreases at the initial stage, because a large load is applied to the drum assembly 110. Then, when the cable operating member 160 is retreated by the first distance, the cable operating member 160 is restricted by the first elastic member 191, and the driven current increases again and has the minimum value I1 at the time point A.

Thus, the control unit 200 receives the driving current and detects the minimum value at step S30.

After the minimum value I1 is detected, the control unit 200 determines whether the driving current increases to a preset value ro more and reaches the first value I2, at step S40. When the cable operating member 160 is restricted by the first elastic member 91 provided in the space part 151, the driving current increases. However, when the minimum value is not detected at step S30, the control unit 200 controls the procedure to return to step S10. In another embodiment, the control unit 200 may determine whether the first reference time elapses from the time point A, at step S40.

When it is determined at step S40 that the driving current increases to the preset value or more and reaches the first value I2 or the first reference time elapses from the time point A, the control unit 200 stops the operation of the driving motor 120 and completes the release of the brake, at step S50.

As described above, the control unit 200 needs to stop the operation of the driving motor 120 when the driving current increases to more than the first value I2 or the first reference time elapses after the minimum value is detected from the slope of the driving current. However, when an abnormality occurs in the control logic, the driving current may continuously increase to more than the first value I2. Then, the cable operating member 160 may be continuously retreated and restricted by the second elastic member 192, and the driving current increases while the slope thereof rapidly changes after a second value I3. As such, when the driving current reaches the second value I3 after the minimum value I1, the control unit 200 may forcibly stop the driving motor 120 by directly controlling the operation of the driving motor 120. Then, although the driving current temporarily increases, the control unit 200 may stop the operation of the driving motor 120, and prevent the cable operating member 160 from excessively moving and colliding with the housing 150. In another embodiment, when a second reference time longer than the first reference time elapses after the minimum value I1, the control unit 200 may forcibly stop the driving motor 120 by directly controlling the operation of the driving motor 120.

In accordance with the embodiments of the present invention the EPB for a vehicle may change the driving current of the driving motor by suppressing the movement of the cable operating member during brake release through the elastic member provided in the space part in which the cable operating member to pull the parking cable in the MOD-type EPB is moved, thereby accurately recognizing the position of the cable operating member based on the change of the driving current. Thus, the EPB may accurately determine when to release the brake, without using a position sensor. Furthermore, the EPB may suppress the movement of the cable operating member through the elastic member, thereby preventing the damage of the actuator housing.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An electronic parking brake (EPB) apparatus for a vehicle, the apparatus comprising:
   a drum assembly comprising a brake drum and a brake lining;
   a driving motor configured for generating a driving force;
   a cable operating member operably coupled to the driving motor and configured to be rotated about an axis by the driving motor's driving force, wherein the cable operating member is configured to move along the axis in a first direction and a second direction opposite to the first direction as it rotates about the axis;
   a parking cable comprising a first end and a second end, the first end operably connected to the brake lining and the second end operably connected to the cable operating member;

a first elastic member configured to apply a first restricting force to the cable operating member when the cable operating member moves in the first direction beyond a first position in the axis for releasing a parking brake;

a second elastic member configured to apply a second restricting force greater than the first restricting force to the cable operating member when the cable operating member moves in the first direction beyond a second position along the axis that is further to the first position in the first direction;

a current sensor configured to sense a driving current for the driving motor; and a controller configured to control operation of the driving motor based on the driving current.

2. The apparatus of claim 1, further comprising a driving gear coupled to the driving motor and a driven gear coupled to the driving gear, wherein the driven gear comprises:

a shaft screwed to the cable operating member; and gear teeth formed on an outer circumference of the shaft.

3. The apparatus of claim 1, further comprising:

a housing housing the cable operating member; and a guide configured to guide rotation and movement of the cable operating member.

4. The apparatus of claim 1, wherein the controller is configured to attempt to stop the driving motor when the driving current reaches a first predetermined value or when a first predetermined time has passed after the driving current reaching a minimum value while releasing the parking brake.

5. The apparatus of claim 4, wherein the controller is further configured to stop the driving motor when the driving current reaches a second predetermined value larger than the first predetermined value or when a second predetermined time longer than the first predetermined time has passed after the driving current reaching the minimum value while releasing the parking brake.

6. A method of operating the apparatus of claim 1 in a vehicle, the method comprising:

monitoring the driving current flowing in the driving motor;

attempting to stop the driving motor when the driving current reaches a first predetermined value while releasing the parking brake; and subsequently stopping the driving motor when the driving current reaches a second predetermined value larger than the first predetermined value while releasing the parking brake.

7. A method of an electronic parking brake apparatus of claim 1 in a vehicle, comprising:

monitoring the driving current flowing in the driving motor;

attempting to stop the driving motor when a first predetermined time has passed after the driving current reaching a minimum value while releasing the parking brake.

8. The method of claim 7, further comprising stopping the driving motor when a second predetermined time longer than the first predetermined time has passed after the driving current reaching the minimum value while releasing the parking brake.

\* \* \* \* \*